United States Patent [19]

Tamamori et al.

[11] 4,368,752
[45] Jan. 18, 1983

[54] COMPOUND CHECK VALVE

[75] Inventors: Hideo Tamamori; Rikisaburo Nagai, both of Kobe, Japan

[73] Assignee: Nippon Air Brake Co., Ltd., Kobe, Japan

[21] Appl. No.: 174,995

[22] Filed: Aug. 4, 1980

[51] Int. Cl.³ ............................................. F16K 15/02
[52] U.S. Cl. ................................... 137/112; 137/512.5
[58] Field of Search ..................... 137/512, 512.5, 112, 137/113

[56] References Cited

U.S. PATENT DOCUMENTS

| | | | |
|---|---|---|---|
| 730,085 | 6/1903 | Berg | 137/112 |
| 2,311,851 | 2/1943 | McClure | 137/113 |
| 2,761,463 | 9/1956 | Wagner | 137/112 |
| 3,038,487 | 6/1962 | Gardner | 137/112 |
| 3,107,681 | 10/1963 | May | 137/112 |
| 3,805,825 | 4/1974 | Lovingham | 137/512 |
| 4,261,381 | 4/1981 | Geiling | 137/112 |

FOREIGN PATENT DOCUMENTS 1490561  6/1967  France ................................. 137/113

Primary Examiner—Robert G. Nilson
Attorney, Agent, or Firm—R. S. Visk; A. G. Williamson, Jr.

[57] ABSTRACT

A compound check valve device comprising a housing having a pair of oppositely disposed inlet ports and an outlet port therebetween, a hollow, two-part valve carrier reciprocably operable in the housing between the inlet ports for selectively communicating the inlet ports, singly or concurrently, to the outlet port, and a spring disposed between the two parts of the valve carrier for biasing respective valves mounted on the valve carrier toward respective valve seats surrounding the two inlet ports so that, in the absence of pressure at the inlet ports, the valve carrier assumes a neutral position in which the inlet ports are cut off from the outlet port, and when pressure is supplied to the inlet ports, the valve carrier assumes a position according to the relative pressures at the inlet ports to communicate either both inlet ports or one inlet port to the outlet port.

3 Claims, 5 Drawing Figures

U.S. Patent    Jan. 18, 1983    4,368,752

COMPOUND CHECK VALVE

BACKGROUND OF THE INVENTION

Presently known compound check valve devices are usually provided with a pair of oppositely disposed inlet ports, to which pressurized fluid is supplied, and an outlet or delivery port to which the pressuized fluid is delivered, and a valve member operable responsively to higher pressure at one of the inlet ports for connecting the higher pressure port to the outlet port. The length of the valve member is such that when it occupies a neutral position (because of equal pressures at both inlet ports) both said inlet ports are in communication with the outlet port. However, if pressure increases at one of the inlet ports so that the valve member begins to shift, if such increase occurs at a relatively slow rate, the higher pressure from said one inlet port may feed back to the lower pressure inlet port.

The above-discussed problem was proposed to be solved by suggesting a compound check valve as shown in FIG. 1 and labeled PRIOR ART.

The compound check valve shown in FIG. 1 comprises a valve carrier 1 reciprocably disposed in a bore 2 formed in a housing 3 between a pair of oppositely disposed inlet ports 4 and 5, to which pressurized fluid is supplied for delivery to an outlet or delivery port 6. The valve carrier 1 is disposed in bore 2 in such a way that it can slide freely in the direction of either of the aforesaid inlet ports 4 and 5. When valve carrier 1 is in a neutral position, communications between inlet ports 4 and 5 and delivery port 6 are shut off. Valves 7 and 8 facing the aforesaid inlet ports 4 and 5, are mounted in annular spaces 9 and 10, respectively, formed coaxially in valve carrier 1. A pair of springs 13 and 14 normally serve to bias valves 7 and 8 against respective stop rings 11 and 12 fixed coaxially in valve carrier 1 when no fluid pressure is present at the inlet ports 4 and 5.

Annular valve seats 15 and 16 with which valves 7 and 8 are adapted for making sealing contact, are fixed in housing 3 in surrounding relation with inlet ports 4 and 5, respectively. When fluid pressure is supplied concurrently to both inlet ports 4 and 5 and one of the pressures is higher than the other, at inlet 4, for example, the higher pressure causes movement of valve carrier 1 toward the lower pressure inlet port 5 to cause valve 8 to be seated on valve seat 16. The higher pressure at inlet port 4, therefore, is communicated with delivery port 6 via passageways 17 opening from bore 2 into said delivery port. In this way, the conventional compound check valve, as just described, operates to detect the higher fluid pressure from one of the inlet ports, in this case inlet port 4, and to supply said higher pressure to delivery port 6. If the pressure at inlet port 5 is higher, the converse operation occurs. If the fluid pressures at both inlet ports 4 and 5 are substantially the same, valve carrier 1 normally stops at its neutral position to cut off communications between both inlet ports 4 and 5 and the delivery port 6. Moreover, even though valve carrier 1 may not stop at the neutral position, it may vacillate in bore 2 to establish a more or less cut-off condition.

The check valve device immediately above described is not necessarily desirable in that it either cuts off delivery of fluid pressure to delivery port 6 completely, or it communicates only one of the inlet ports 4 and 5 at a time to said delivery port.

SUMMARY OF THE INVENTION

The object of the present invention is to provide a compound check valve equipped with a valve mechanism capable of detecting a higher fluid pressure coming from one or the other of two inlet ports supplied with respective fluid pressures, and delivering such fluid pressure to an outlet or delivery port, said valve mechanism also being capable of delivering such fluid pressure to said delivery port even when the fluid pressures from the two inlet ports are substantially the same.

DESCRIPTION AND OPERATION

Figure 1:
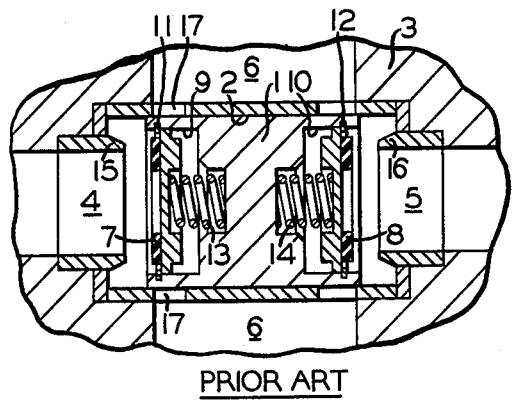
FIG. 1 is a sectional view of a compound check valve device showing the prior art.
Figure 2:
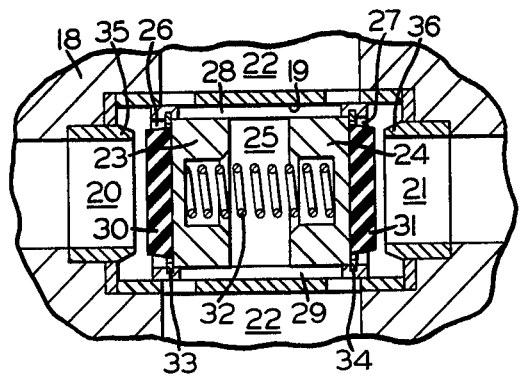
FIG. 2 is a sectional view of a compound check valve device embodying the invention.

A compound check valve device embodying the invention, as shown in FIG. 2, comprises a valve housing 18 having a coaxial bore 19, oppositely disposed pressure inlet ports 20 and 21, and an outlet or delivery port 22 opening from said bore. A valve carrier unit, including two axially movable and separate piston-like valve mounts 23 and 24, is reciprocably coaxially disposed in the aforesaid bore 19 in such a way as to be freely axially slidable in the direction of either of the inlet ports 20 or 21. The valve carrier unit is of sufficient length as to cut off connection between inlet ports 20 and 21 and the delivery port 22 when it is in a neutral position, in which it is shown in FIG. 2. Valve elements 30 and 31 are secured on valve mounts 23 and 24 in facing relation to inlet ports 20 and 21, respectively, and are undercut to provide openings or inlet passageways 26 and 27 communicating with inlet ports 20 and 21, respectively. The valve carrier unit is also provided with longitudinal passageways 28 and 29 communicating with delivery port 22 and both being communicable, as will hereinafter become evident, with passageways 26 and 27.

The valve carrier unit has a spring chamber 25 formed cooperatively by and between valve mounts 23 and 24. A compression spring 32, compressibly disposed in spring chamber 25 between valve mounts 23 and 24, normally urges said valve mounts into abutting contact with stop rings 33 and 34 fixed in the ends, respectively, of the valve carrier unit. A pair of valve seats 35 and 36, with which valve elements 30 and 31 are adapted to make sealing contact when valve mounts 23 and 24, respectively, are moved thereagainst in a manner to be hereinafter explained, are installed in housing 18 in surrounding relation to inlet ports 20 and 21, respectively. Valve elements 30 and 31 are elastic in nature and may be made of resilient material such as rubber, for example, for making an air-tight seal when said valves make contact with valve seats 35 and 36, respectively.

Figure 3:
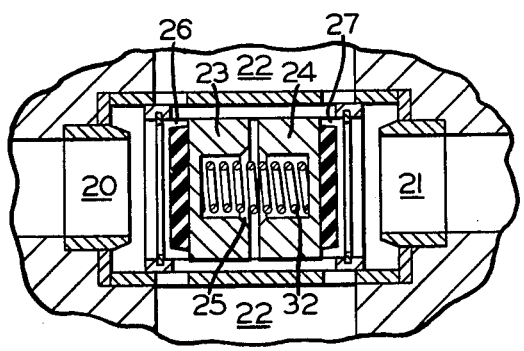
FIG. 3 is a sectional view of the compound check valve device shown in FIG. 2 with certain components thereof shown in operated positions.

The operation of the compound check valve device embodying the invention and shown in FIGS. 2 and 3, will now be explained. When fluids with different pressures are supplied to inlet ports 20 and 21, with the pressure at port 20, for example, higher than that of port 21, valve mount 23 will be moved toward the lower pressure port 21 by the force of said higher pressure, thereby opening passageway 26 to passageways 28 and 29. As a result, with inlet port 20 thus being connected to delivery port 22 via passageways 26, 28, and 29, the higher pressure from said port 20 will be delivered to delivery port 22. If the pressure differential is great enough, the valve carrier unit will move to the right so that valve element 31 will seal against valve seat 36, thus closing inlet port 21. When fluids at the same pressure are supplied to inlet ports 20 and 21, valve mounts 23 and 24 are subjected to equal pressures from opposite directions, and, as shown in FIG. 3, valve mount 23 will move to the right against the force of spring 32 disposed in spring chamber 25. Valve mount 23 will thus be moved out of contact with stop ring 33 to connect passageway 26, through passageways 28 and 29, to delivery port 22. Similarly, valve mount 24 will move to the left against the force of spring 32, under the pressure at inlet port 21, so that said valve mount will be moved out of contact with stop ring 34 to connect passageway 27, through passageways 28 and 29, with delivery port 22. Thus, when fluids at different pressures are supplied to inlet ports 20 and 21, valve mounts 23 and 24 operate accordingly to deliver fluid pressure from the higher pressure side to delivery port 22. When fluids at the same pressure are supplied to inlet ports 20 and 21, both fluid pressures will be communicated to delivery port 22.

Figure 4:
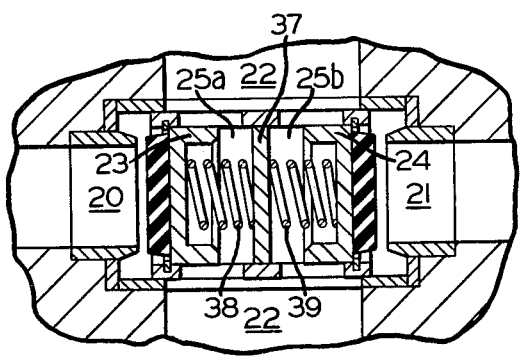
FIG. 4 is a sectional view of a modified check valve device as shown in FIG. 2.

As shown in FIG. 4, a partition wall 37 may be installed in spring chamber 25 between valve mounts 23 and 24 for dividing the spring chamber into two compartments 25a and 25b in which are disposed respective springs 38 and 39, each having one end bearing against the partition wall and the other end bearing against the respective valve mount. As will be obvious, the functions of the device shown in FIG. 4 are similar to those of the valve device shown in FIG. 2.

Figure 5:
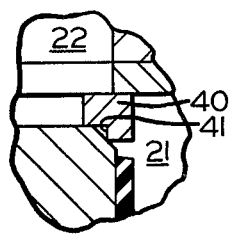
FIG. 5 is a fragmentary view, in section, of a modification of the check valve device shown in FIG. 2.

In FIG. 5, a portion of a modified valve device is shown which differs from that shown in FIG. 2 in that stop rings 33 and 34 are replaced by annular members 40, only a portion of one being shown, having a shoulder 41 formed thereon which performs the same function as said stop rings, as above described.

It is seen that the compound check valve device of the present invention comprises a freely slidable valve carrier unit with valve mounts installed therein. When the valve carrier unit is in a neutral position, communications between the inlet ports and the outlet or delivery port are cut off. When fluid pressure is supplied to the inlet ports at a relatively low rate, feedback of fluid pressure from the higher pressure inlet to the lower pressure inlet is prevented, yet even though fluids at the same pressure are supplied to the respective inlet ports, said inlet ports can still be communicated with the delivery port. Therefore, the more-or-less closed state, as above discussed, of the check valve device is also prevented.

Having thus described the invention, what we claim as new and desire to secure by Letters Patent, is:

1. A compound check valve comprising,
   (a) a housing having a coaxial bore formed therein with a fluid pressure inlet port at each end thereof and a delivery port opening to said bore between the ends thereof,
   (b) a valve carrier unit coaxially positioned and reciprocably movable within said bore and of sufficient length to span the opening of said delivery port into said bore,
   (c) a pair of piston-like valve mounts, one operably positioned at each end of said valve carrier unit in facing relation to the inlet ports, said valve mounts being axially movable relative to the carier unit and to each other for controlling communication between the inlet ports and the delivery port,
   (d) a valve element mounted on each valve mount at the end facing the corresponding inlet port,
   (e) biasing means compressibly interposed between said valve mounts in a chamber formed cooperatively by and between said valve mounts within said valve carrier unit for urging said valve mounts in opposite axial directions,
   (f) a pair of annular stop rings, one disposed adjacent each end of said valve carrier unit for limiting outward axial movement of said valve mounts with respect to said valve carrier unit,
   (g) cooperating passageways comprising longitudinal passageways formed axially in said valve carrier unit and inlet passageways formed by the outer end of each valve mount and element for at times providing communication between one or both inlet ports and said delivery port,
   (h) said carrier unit and said valve mounts being positioned by said biasing means, in the absence of fluid pressure at both inlet ports, to a neutral position in which communication between said inlet ports and said delivery port is cut off by said carrier unit,
   (i) said valve mounts and said carrier unit being operable, in response to fluid pressure at both inlet ports, to a first or a second fluid pressure delivery position for establishing communication between the inlet port having the higher fluid pressure and said delivery port, and
   (j) said valve mounts being also operable to a third delivery position, in response to substantially equal fluid pressures at both said inlet ports, for establishing communication between both inlet ports and said delivery port through said cooperating passageways.

2. A compound check valve device, as set forth in claim 1 in which,
   said biasing means is a spring compressibly disposed axially in said chamber for urging said valve mounts axially in opposite directions against the associated stop rings.

3. A compound check valve device, as set forth in claim 1, in which,
   (a) said valve carrier unit also includes a separating partition intermediate the ends thereof for dividing said chamber into a pair of compartments, and
   (b) said biasing means is a pair of springs, one compressibly disposed axially in each compartment for urging said valve mounts in opposite axial directions against said stop rings.

* * * * *